Patented May 28, 1929.

1,715,332

UNITED STATES PATENT OFFICE.

LOUIS BENDA, OF MAINKUR, NEAR FRANKFORT-ON-THE-MAIN, AND WERNER SCHMIDT, OF FECHENHEIM, NEAR FRANKFORT-ON-THE-MAIN, GERMANY, ASSIGNORS TO WINTHROP CHEMICAL COMPANY, INC., OF NEW YORK, N. Y., A CORPORATION OF NEW YORK.

ALKOXYACRIDINES.

No Drawing. Application filed April 26, 1923, Serial No. 634,895, and in Germany May 24, 1922.

We have found that by the action of alkylating agents hydroxyacridines, as for instance 3.6-dihydroxyacridine—Benda, Berichte 45,1704 (1912)—2.7-dimethyl-3,6-dihydroxyacridine (German Patent 121686 Kl. 22$^b$) and others, may be converted into O-alkyl ethers, without at the same time alkylating the nitrogen nucleus. The bases of the new compounds correspond to the formula

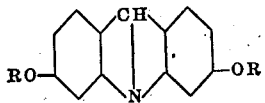

R means an alkyl radical.

Owing to their non-toxicity and high inhibitory power in respect of bacteria the new products are adapted for the prevention and cure of a great variety of infections. The dimethylether of 3.6-dihydroxyacridine which in experiments on animals has proved nearly non-toxic, still arrests for instance the growth of diphtheria bacilli, and streptococci, even if applied in a highly diluted form, whereas 3.6-dihydroxyacridine remains practically ineffective, even if administered in a highly concentrated form.

Also the O-monoalkylethers of the dihydroxyacridines, forming in addition to the dialkylethers, are valuable disinfectants and curatives.

*Example I.*—3.6-dimethoxyacridine.

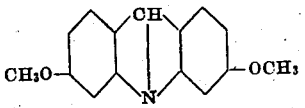

211 gr. 3.6-dihydroxyacridine are dissolved in 2000 cc. water with the addition of 80 gr. caustic soda. 256 gr. dimethylsulphate are gradually added to this solution while stirring continuously until the dimethylsulphate has disappeared and the solution has become nearly neutral, thereafter another 25 gr. dimethylsulphate and 16 gr. caustic soda (dissolved in a little water) are added and the 3.6-dimethoxyacridine, precipitated at the end of the reaction, is filtered off. The crude base is dissolved in hot dilute hydrochloric acid. On cooling down the filtered solution, the hydrochloride crystallizes in slightly colored needles. From the hydrochloride the free base is produced in the usual manner.

The alkaline mother liquor contains monomethylether of the 3.6-dihydroxyacridine. It is produced from the solution by exact neutralizing with acetic acid.

3.6-dimethoxyacridine $C_{15}H_{13}NO_2$. It crystalizes from ether in fine, slightly yellowish needles, or stout, light yellow crystals of a melting point (uncorr.) of 138–139° C. It is readily soluble in warm ether, alcohol, methyl alcohol, benzene and acetone, sparingly soluble in hot water, and insoluble in dilute alkalies and carbonates of alkalies. In concentrated sulphuric acid the solution is yellow and strongly greenish fluorescent. In glacial acetic acid and in hot, dilute mineral acids dimethoxyacridine dissolves easily with a yellow color and green fluorescence, and on adding an excess of dilute mineral acid, the respective salts crystalize in the form of yellow needles.

*Example II.*—3.6-diethoxyacridine.

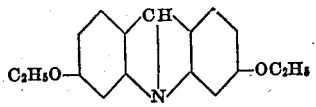

106 gr. 3.6-dihydroxyacridine are dissolved hot with 2 litres water and 100 cc. caustic soda solution 38° Bé. The solution is filtered and while hot, 200 gr. diethylsulphate are gradually added, stirring well. Heating in the water bath is continued until the solution reacts nearly neutral, 35 gr. caustic soda solution added and after complete reaction the 3.6-diethoxyacridine is filtered off. By careful neutralizing the alkaline mother liquor with acetic acid, slight quantities of monoethylether are obtained.

3.6 - diethoxyacridine crystallizes from ether in fine, yellow needles of 142–143° C., melting point (uncorr.). The solubility of the base corresponds with that of the dimethoxyacridine. The salts are far less readily soluble in water than those of the base named. The hydrochloride crystallizes in reddish needles of bluish shining surface.

*Example III.*—3.6-bishydroxy ethoxy acridine.

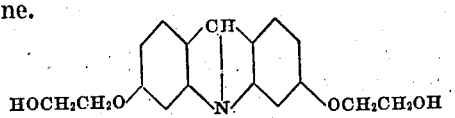

84 gr. 3.6-dihydroxyacridine are mixed with 80 cc. caustic soda solution 40° Bé., 100 cc.

water and 150 cc. alcohol, adding 80 gr. ethylenechlorhydrin, and heating the mixture for 3 hours at 150° C. in an autoclave. After opening, the contents are cooled down to 0° C., the precipitated 3.6-bishydroxy ethoxy acridine stirred for 5 hours in dilute caustic soda solution, and after sucking off dissolved with dilute hydrochloric acid, precipitated once more with soda solution, and finally recrystallized from alcohol. The base thus obtained is represented by slightly reddish-yellow crystals of melting point 200° C.

It is insoluble in a carbonate of soda solution, also in cold soda solution, sparingly soluble in hot soda solution, precipitating in this solution on cooling down; in hot water it is difficultly soluble and practically insoluble in cold, dissolving in concentrated sulphuric acid with a fallow color and slightly green fluorescence.

It may also be produced without pressure and alcohol by heating the mixture for 36 hours in the oil bath to 150–160° C.

Having now particularly described and ascertained the matter of our said invention and in what manner the same is to be performed, we declare that what we claim is:

1. A process for the production of dialkoxyacridines by heating 3.6-dihydroxyacridines in the presence of acid-binding substances with alkylating agents.

2. A process for the production of dimethoxyacridines by heating 3.6-dihydroxyacridine in the presence of acid-binding substances with methylating agents.

3. As new substances salts of 3.6-dialkoxyacridines corresponding to the formula:

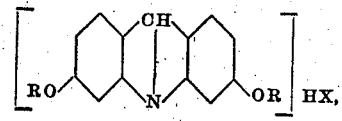

in which formula R means an alkyl radical and X means an anion, being yellow water soluble crystalline compounds.

4. As a new substance the hydrochloride of 3.6-dimethoxyacridine, corresponding probably to the formula:

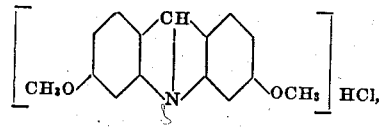

crystallizing in light yellow needles, soluble in hot water, scarcely soluble in cold water.

In witness whereof we have hereunto signed our names this 29th day of March, 1923.

LOUIS BENDA.
WERNER SCHMIDT.